United States Patent [19]
Takeyama et al.

[11] Patent Number: 6,122,650
[45] Date of Patent: Sep. 19, 2000

[54] METHOD AND APPARATUS FOR UPDATING TIME RELATED DATA IN A MODIFIED DOCUMENT

[75] Inventors: Tetsuo Takeyama, Gifu; Kayo Yoshimura, Ogaki; Yoshinori Hatayama, Komaki; Masuo Kondo, Ogaki, all of Japan

[73] Assignee: Sanyo Electric Co., Ltd., Osaka, Japan

[21] Appl. No.: 09/064,618

[22] Filed: Apr. 23, 1998

[30] Foreign Application Priority Data

Apr. 25, 1997 [JP] Japan .................................. 9-109814

[51] Int. Cl.⁷ .................................................. G06F 17/30
[52] U.S. Cl. .......................... 707/540; 707/532; 707/530; 707/1
[58] Field of Search ................... 707/1, 540, 530, 707/532

[56] References Cited

U.S. PATENT DOCUMENTS

| | | | |
|---|---|---|---|
| 5,267,155 | 11/1993 | Buchanan et al. | 707/540 |
| 5,530,645 | 6/1996 | Chu | 707/532 |
| 5,809,513 | 9/1998 | Okishima | 707/530 |
| 5,859,636 | 1/1999 | Pandit | 345/335 |

*Primary Examiner*—Thomas G. Black
*Assistant Examiner*—William Trinh
*Attorney, Agent, or Firm*—Armstrong, Westerman, Hattori, McLeland & Naughton

[57] ABSTRACT

A document processing apparatus includes a text processor which compares temporal words and phrases of a first document which is used to generate a second, modified document, with temporal words and phrases in the second, modified document, and with temporal metrics. The result of the comparison operation is used to determine whether any temporal words in the modified document have not been updated or should be changed. The document processing apparatus helps to avoid inadvertent errors or omissions concerning temporal phrases, including dates, made when a new document is created using a pre-existing document.

25 Claims, 12 Drawing Sheets

| WORD/PHRASE TABLE TEXT 1 | EVALUATION METRICS start | end | MODIFICATION | ALERT FLAG |
|---|---|---|---|---|
| 1 October 6, 1996 | 96.10.06 | 96.10.06 | | |
| 2 IN THE SEASON OF RED LEAVES | **.10.01 | **.10.31 | | |
| 3 YESTERDAY | — | — | | |
| (END) | | | | |

| WORD/PHRASE TABLE TEXT 2 | EVALUATION METRICS start | end | MODIFICATION | ALERT FLAG |
|---|---|---|---|---|
| 1 April 6, 1997 | 97.04.06 | 97.04.06 | YES | |
| 2 IN THE SEASON OF RED LEAVES | **.10.01 | **.10.31 | NO | ON |
| 3 YESTERDAY | — | — | NO | ON |
| (END) | | | | |

To Mr. ·····
······ Company

······ Company
Accounting Division ······

Notice of Remittance

Sirs:

In the season of red leaves, we are delighted to hear of your prosperity, and highly apreciate your special favors endowed to us at ordinary times.
　　Kindly be informed that we made a transfer yesterday to your specified bank account for the charge of ··· billed in your statement of account yesterday.
　　We beg your trouble to mail your receipt by return.

To Mr. ·····
······ Company

······ Company
Accountion Division ······

Notice of Remittance

Sirs:

In the season of red leaves, we are delighted to hear of your prosperity, and highly apreciate your special favors endowed to us at ordinary times.
　　Kindly be informed that we made a transfer yesterday to your specified bank account for the charge of ··· billed in your statement of account yesterday.
　　We beg your trouble to mail your receipt by return.

<u>Inter-company Communication</u>

Date: <u>December 10, 1997</u>
To: <u>Hanako Sato</u>
From: Ichiro Tanaka
Subject: Product Development Meeting Announcement
Message:

This is to announce details for our annual Product Development Meeting. You are encouraged to select attendees from your departments who could benefit from and contribute to proceedings.Please submit your firm list of attendees by <u>December 16, 1997.</u>

*Place: Rose Room, Hotel New York
    *Date: <u>December 21, 1997</u>
    *Time: <u>9:00A.M. to 5:00P.M.</u>
    The agenda is attached.

If you'll take a <u>Christmas</u> holiday, Please call me up on the phone until <u>December 12, 1997.</u>

My phone number is 03-3931-6954.

Fig.10

Inter-company Communication

Date: January 20, 1998
To: Hanako Sato
From: Ichiro Tanaka
Subject: Product Development Meeting Announcement
Message:

This is to announce details for our annual Product Development Meeting. You are encouraged to select attendees from your departments who could benefit from and contribute to proceedings.Please submit your firm list of attendees by December 16, 1997.

*Place: Rose Room, Hotel New York
  *Date: December 21, 1997
  *Time: 9:00A.M. to 5:00P.M.
  The agenda is attached.

If you'll take a Christmas holiday, Please call me up on the phone until December 12, 1997.

My phone number is 03-3931-6954.

| WORD/PHRASE TABLE | Start | End | MODIFICATION | ALERT |
|---|---|---|---|---|
| December 10, 1997 | 1997.12.10 | 1997.12.10 | -- | -- |
| December 16, 1997 | 1997.12.16 | 1997.12.16 | -- | -- |
| December 21, 1997 | 1997.12.21 | 1997.12.21 | -- | -- |
| Christmas | **.12.01 | **.12.25 | -- | -- |
| December 12, 1997 | 1997.12.12 | 1997.12.12 | -- | -- |
| (END) | | | | |

| WORD/PHRASE TABLE | Start | End | MODIFICATION | ALERT |
|---|---|---|---|---|
| January 20, 1998 | 1998.01.20 | 1998.01.20 | YES | -- |
| December 16, 1997 | 1997.12.16 | 1997.12.16 | -- | ON |
| December 21, 1997 | 1997.12.21 | 1997.12.21 | -- | ON |
| Christmas | **.12.01 | **.12.25 | -- | ON |
| December 12, 1997 | 1997.12.12 | 1997.12.12 | -- | ON |
| (END) | | | | |

Fig.13

```
                    Inter-company Communication

Date:       January 20, 1998
To:         Hanako Sato
From:       Ichiro Tanaka
Subject:    Product Development Meeting Announcement
Message:

This is to announce details for our annual Product
            Development Meeting. You are encouraged to select
            attendees from your departments who could benefit from
            and contribute to proceedings.Please submit your firm
            list of attendees by December 16, 1997.

*Place:  Rose Room, Hotel New York
              *Date:   December 21, 1997
              *Time:   9:00A.M. to 5:00P.M.
              The agenda is attached.

If  ┌─────────────┐ Christmas holiday, Please call me
              up  │ SUBSTITUTE  │ u̶n̶t̶il December 12, 1997.
                  │  CANDIDATE  │
              My  │   Easter    │ is 03-3931-6954.
                  └─────────────┘
```

|  | Start (month, day) | End (month, day) |
|---|---|---|
| Easter | 03, 01 | 04, 24 |
| Summertime | 03, 31 | 10, 31 |
| Halloween | 10, 25 | 10, 31 |
| Thanksgiving | 11, 16 | 11, 30 |
| Christmas | 12, 01 | 12, 05 |

Ｕ.Ｓ. Patent No. 6,122,650

METHOD AND APPARATUS FOR UPDATING TIME RELATED DATA IN A MODIFIED DOCUMENT

BACKGROUND OF THE INVENTION

The present invention relates to a document processing apparatus and method, and more particularly, to an aid for editing a document which pays particular attention to the usage of time-related words.

In order to quickly prepare a document, parts of existing documents are frequently reused. However, persons editing text often overlook or fail to update time related words, such as today, yesterday or seasonal terms, such as spring.

It is an object of the present invention to provide a document processing apparatus and method which avoids an omission or an erroneous correction for a time-related word appearing in a document.

SUMMARY OF THE INVENTION

Briefly stated, the present invention provides a document processing apparatus for editing document data. The apparatus includes an input unit, a processing unit and an output unit. The input unit receives first document data and second document data. The second document data is a revised version of the first document data. The first and the second document data includes first and second word data related to time, respectively. The processing unit is connected to the input unit, receives the first and the second document data from the input unit and determines whether the second time-related word data is properly updated using the first and the second time-related word data. The output unit outputs the determination result to inform an operator that the second time-related word data has been properly updated.

The present invention provides a document processing apparatus for editing document data. The apparatus includes an input unit, a first storage unit, a second storage unit, a display unit, a control unit and a processing unit. The input unit is used by an operator to prepare first document data and permits second document data to be prepared by updating the first document data. The first and the second document data include first and second time-related word data, respectively. The first storage unit stores the first document data. The second storage unit for stores the second document data. The display unit displays the first and second document data. The control unit causes the first document data stored in the first storage unit to be displayed on the display unit before editing the first document data takes place and causes the second document data stored in the second storage unit to be displayed on the display unit after editing the first document data. The processing unit reads the first and the second document data from the first and the second storage unit, respectively and for determines if the second time-related word data has not been properly updated using the first and the second timerelated word data. The control unit controls the display unit so that the improperly updated second time-related word data is displayed on the display unit in a manner identifiable by the operator.

The present invention provides a document processing method for editing document data. The method includes the steps of: inputting first document data and second document data, the second document data being an updated version of the first document data, the first and the second document data including first and second time-related word data, respectively, determining whether the second time-related word data is properly updated using the first and the second time-related word data; and outputting a result of determination such that the improperly updated second timerelated word data is recognized by an operator.

The present invention provides a document processing method for editing document data. The method includes the steps of: inputting first document data and second document data, the second document data being an updated version of the first document data, the first and the second document data including first and second time-related word data, respectively; storing the first document data in a first storage unit; storing the second document data in a second storage unit; displaying the first document data stored in the first storage unit on a display unit before editing the first document data and displaying the second document data stored in the second storage unit on the display unit after editing the first document data; reading the first and the second document data from the first and the second storage units, respectively; detecting second time-related word data which has not been properly updated using the first and the second time-related word data; and displaying the detected improperly updated second time-related word data on the display unit in a manner identifiable by an operator.

The present invention provides a recording medium having stored therein a computer readable program for editing document data. The program executes a method including the steps of: receiving first document data and second document data, the second document data being a revised version of the first document data, the first and the second document data including first and second timerelated word data, respectively; determining whether the second time-related word data has been properly updated using the first and the second time-related word data; and outputting a determination result such that the improperly updated second time-related word data is recognized by an operator.

The present invention provides a recording medium having stored therein a computer readable program for editing a document. The program executes a method including the steps of: receiving first document data and second document data, the second document data being a revised version of the first document data, the first and the second document data including first and second time-related word data, respectively; storing the first document data in a first storage unit; storing the second document data in a second storage unit; displaying the first document data stored in the first storage unit on a display unit before editing the first document data and displaying the second document data stored in the second storage unit on the display unit after editing the first document data; reading the first and the second document data from the first and the second storage units, respectively; detecting the second time-related word data which has not been properly updated using the first and the second time-related word data; and displaying the improperly updated second time-related word data on the display unit in a manner identifiable by an operator.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiment together with the accompanying drawings in which.

DETAILED DESCRIPTION OF THE PREFERRED EMBODIMENT

Figure 1:
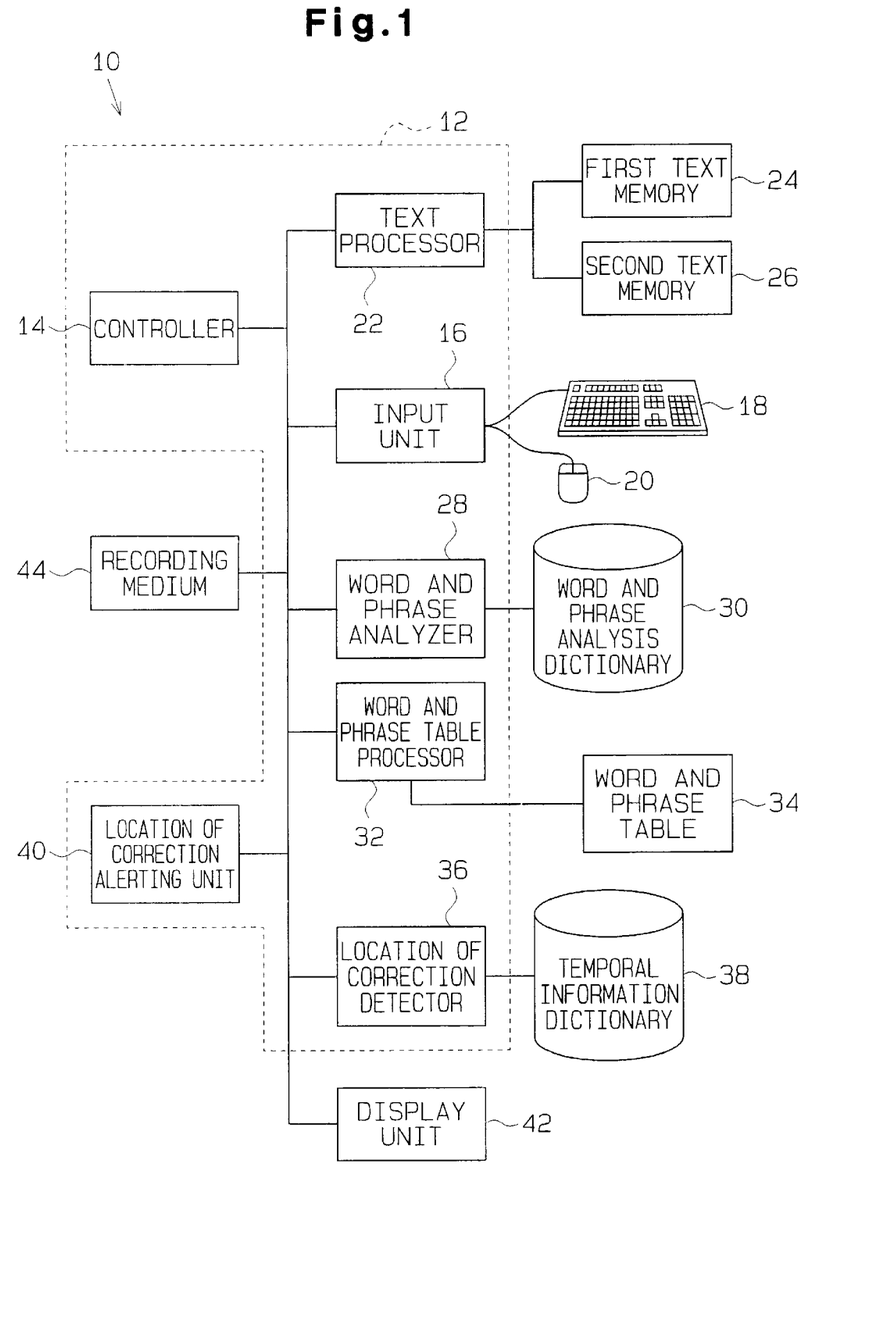
FIG. 1 is a schematic block diagram of a document processing apparatus according to one embodiment of the present invention.

Certain words are used in the description for convenience and are not meant to be limiting. Such words includes the word "correction" which, as used herein, refers to a change made to text of a pre-existing document. One embodiment of the present invention will be described below with reference to the drawings. FIG. 1 is a schematic block diagram of a document processing apparatus 10 according to the present invention. The document processing apparatus 10 comprises a central processing unit (CPU) 12, a keyboard 18, a mouse 20, first and second text memories 24, 26, a word and phrase analysis dictionary 30, a word and phrase table 34, a temporal information dictionary 38 and a display unit 42.

The CPU 12 operates in accordance with a control program stored in a storage or recording medium 44 to function as a controller 14, an input unit 16, a text processor 22, a word and phrase analyzer 28, a word and phrase processor 32, a location of correction detector 36 and a location of correction alerting unit 40.

Figure 7:
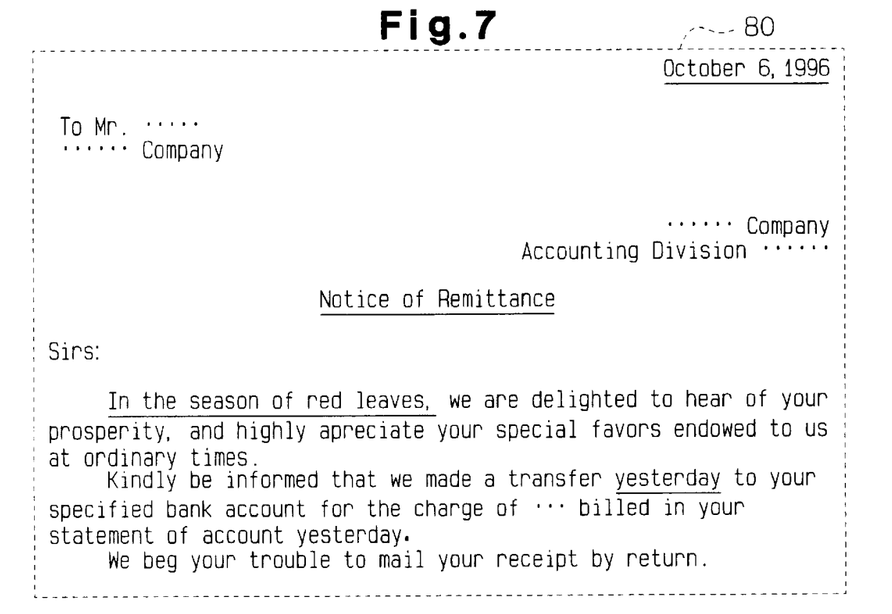
FIG. 7 depicts a text before modification as displayed on a display screen.

The input unit 16 receives character string data (hereafter referred to as text data) for a document such as a document 80 shown in FIG. 7, for example, which is entered from an input device, such as the keyboard 18. The keyboard 18 and the mouse 20 operate as understood by those of ordinary skill in the art. For example, the mouse 20 is used to effect a cursor movement or zone designation displayed on the display unit 42 during the preparation of a document. The input unit 16 may also receive data stored on a recording medium, such as a floppy disk (not shown) or a hard disk unit (not shown).

Figure 8:
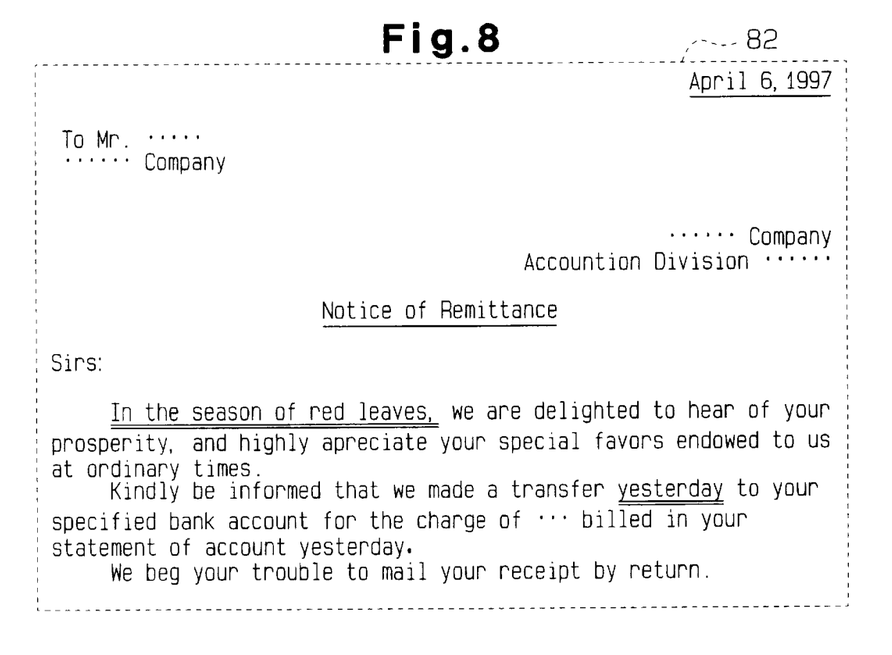
FIG. 8 depicts a modified text as displayed on the display screen.

The text processor 22 receives text data from the input unit 16 and stores the text data it the first text memory 24 as pre-correction text data. The text processor 22 also stores text data, which is corrected by an operator using the keyboard 18 and/or the mouse 20, into the second text memory 26. FIG. 8 shows a document 82 which corresponds to the document 80, shown in FIG. 7, in which only the timerelated word (hereafter simply referred to as temporal word or phrase) have been corrected or changed.

The display unit 42 includes an LCD (liquid crystal) display or CRT display which displays the document 82 by formulating character strings corresponding to the latest version of text data, of course, the display unit 42 displays the document 80 shown in FIG. 7, for example, by formulating character strings corresponding to the pre-correction text data stored in the first text memory 24. As a correction is made in the document, character strings corresponding to the corrected text data, which is stored in the second text memory 26, are formulated, and the document 82 is displayed.

The word and phrase analysis dictionary 30 stores an analysis rule for splitting the character string data into parts of speech, morphemes, and punctuation marks, such as commas, periods, spaces. As will be understood by those of ordinary skill in the art, other analysis rules could be used. For instance, a rule which breaks the character strings into phrases, semantemes and punctuation marks could be used.

The word and phrase analyzer 28 reads the pre-correction and the corrected text data from the first and second text memories 24, 26, respectively, and splits the character string data corresponding to the pre-correction and the corrected text data into morphemes. The word and phrase analyzer 28 then analyzes the morphemes.

Figure 5:
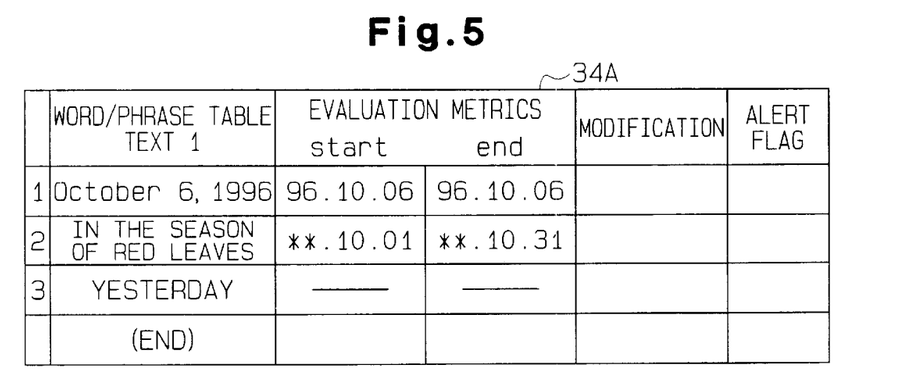
FIG. 5 is a word and phrase table for text data in a document before modification.
Figure 6:
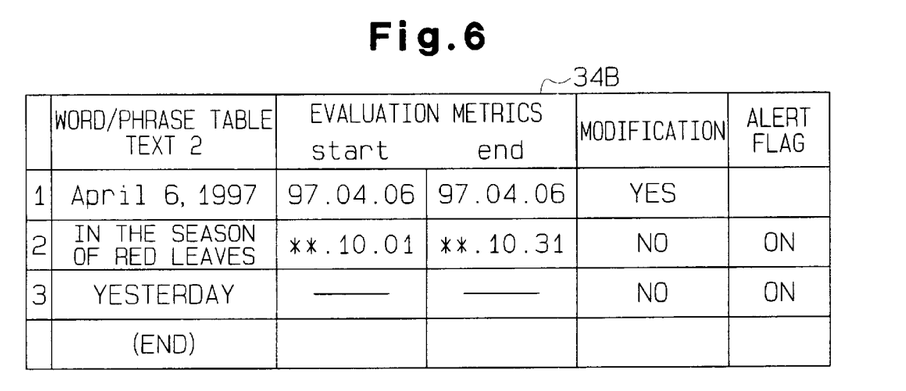
FIG. 6 is the word and phrase table of FIG. 5 after modification.

As the text data is changed or corrected using the keyboard 18 or the mouse 20, the word and phrase table processor 32 extracts a time-related word or words from among the words obtained by the morpheme analysis of the word and phrase analyzer 28 and stores them in the word and phrase table 34. FIG. 5 shows a word and phrase table 34A formed on the basis of the text data of the document 80 shown in FIG. 7. The word and phrase table 34A includes the extracted temporal words or phrases "Oct. 6, 1996", "in the season of red leaves " and "yesterday". FIG. 6 shows a word and phrase table 34B formed on the basis of the text data of the document 82 shown in FIG. 8. The word and phrase table 34B includes extracted temporal words or phrases "Apr. 6, 1997", "in the season of red leaves" and "yesterday".

The temporal information dictionary 38 stores information representing evaluation metrics which define a permissible interval of use for a temporal word. In the present embodiment, the permissible interval of use is defined by start data and end data, and the interval can be changed at will. For example, start data expressed in Anno Domini includes numeral digits representing the year in four digits, but from which two-leading digits are omitted, periods standing for "year" and "month", and numeral digits which represent month and day. The word day is omitted. End data expressed in Anno Domini is similar to the start data. Where the mouth and the day are each represented by a single digit X, the digit X is converted into 0X. For the temporal phrase "in the season of red leaves", the start data includes "* *. 10. 01" and the end data includes "* *.10. 31" where "*" is an arbitrary numeral. The temporal word "yesterday" is not specified with a date, and therefore has no evaluation metrics information associated therewith.

On the basis of the temporal information included in the temporal information dictionary 38, the location of correction detector 36 determines the start data and the end data of the evaluation metrics for each temporal word extracted by the word and phrase table processor 32. The start data and end data are stored in the word and phrase tables 34A and 34B. The location of correction detector 36 then compares corresponding temporal words between the word and phrase tables 34A, 34B to confirm whether the temporal word has been modified. A result of confirmation is stored in the word and phrase table 34B. The location of correction detector 36 compares the evaluation metrics of the modified temporal word against the evaluation metrics of each temporal word in the word and phrase table 34B, and identifies if each temporal word is within the permissible interval of use on the basis of a result of the comparison. For a temporal word which is out of the permissible interval of use, an alert flag is activated in the word and phrase table 34B. Specifically, an alert flag is turned ON for a temporal word having evaluation metrics which contradict the evaluation metrics of the temporal word indicated as modified.

In order to alert an operator for any omission or mistake of a correction, the location of correction alerting unit 40 displays the temporal word for which the alert flag is turned ON on the display unit 42, preferably using an emphasis display, such as a high luminance or flashing display.

The controller 14 controls the input unit 16, the text processor 22, the word and phrase analyzer 28, the word and phrase table processor 32, the location of correction detector 36, the location of correction alerting unit 40 and the display unit 42.

Figure 2:
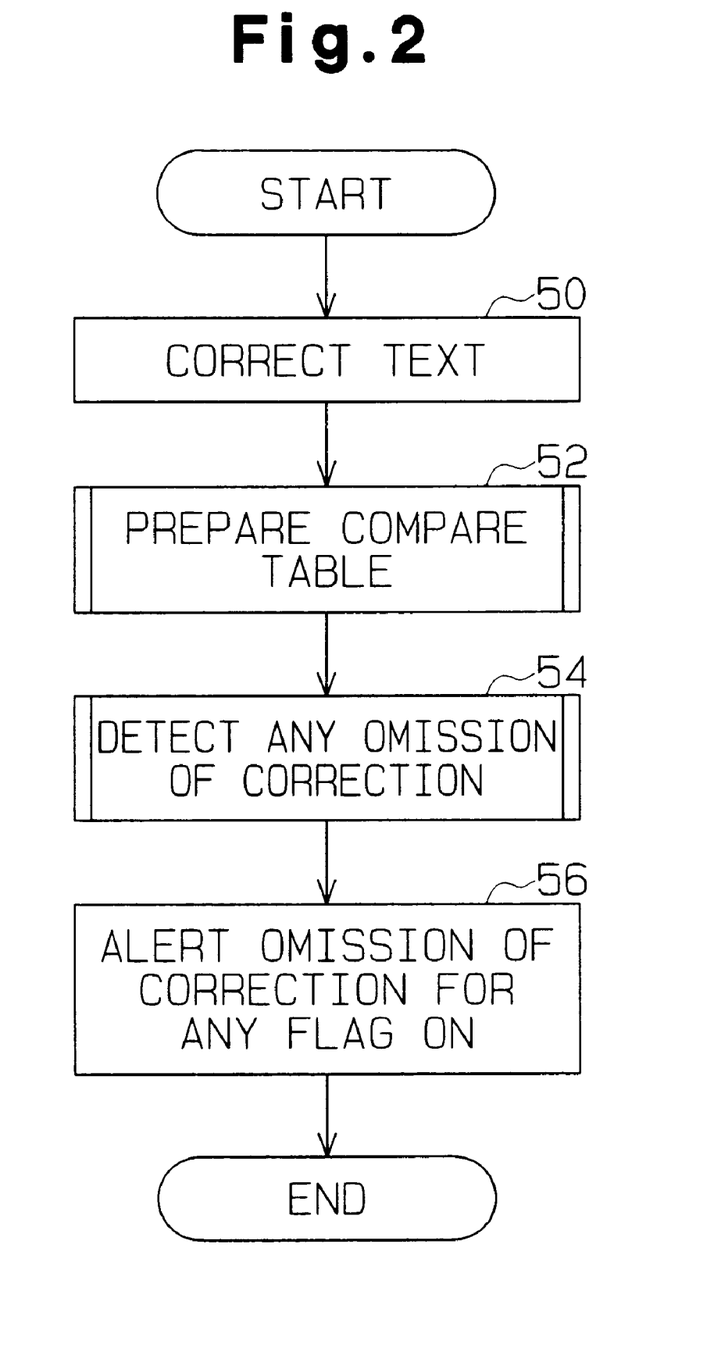
FIG. 2 is a flow chart of an alert operation for temporal word.

The operation of the document processing apparatus 10 will now be described with reference to the flow charts shown in FIGS. 2 through 4. When the text data is input to the input unit 16, the controller 14 controls the text processor 22 to store the text data into the first text memory 24, and also controls the display unit 42 to display a document corresponding to the text data thereon.

At step 50, the operator modifies the text data using the keyboard 18 or the mouse 20. A document corresponding to the modified text data (i.e., the changed and unchanged data) is displayed on the display unit 42.

At step 52, the word and phrase table 34A which includes evaluation metrics of temporal words in the pre-modification text data and the word and phrase table 34B which includes evaluation metrics of temporal words in the modified text data are prepared.

Figure 3:
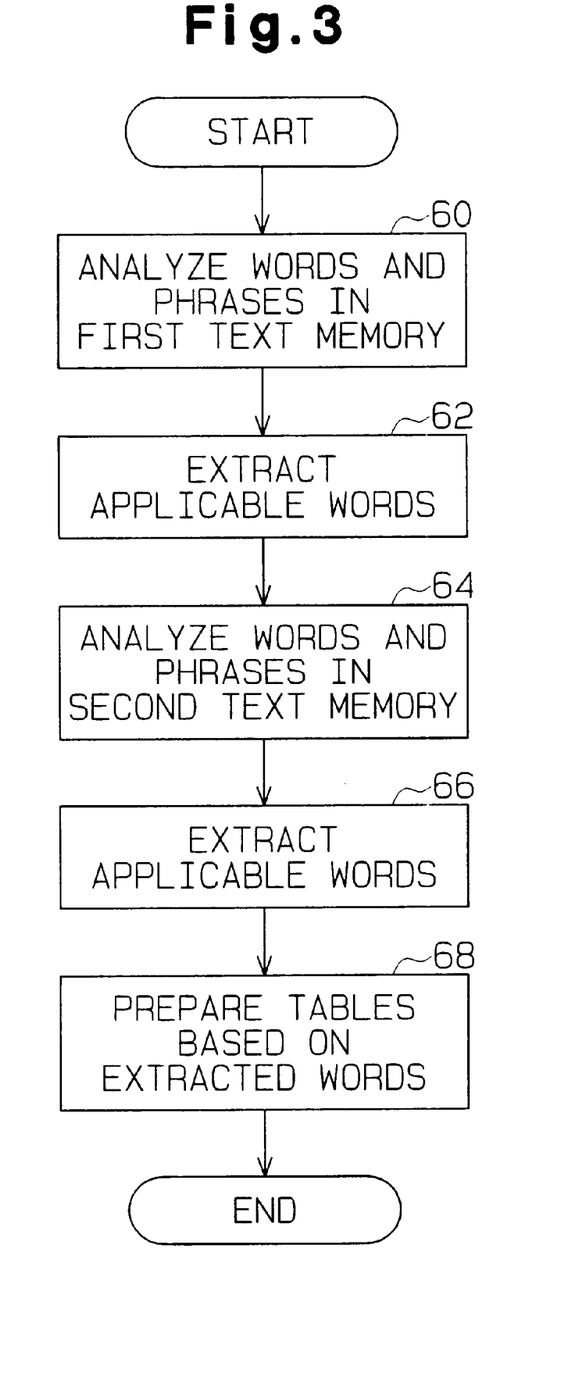
FIG. 3 is a flow chart of a subroutine of the alert operation of FIG. 2, which prepares a temporal word table.

FIG. 3 shows the preparation of the word and phrase tables which takes place at step 52 in detail. Initially, the word and phrase analyzer 28 reads the pre-modification text data from the first memory 24 and then performs a morpheme analysis thereon according to the analysis rule in the word and phrase analysis dictionary 30.

At step 62, the word and phrase table processor 32 extracts temporal words from the pre-correction text data which have been subjected to the morpheme analysis.

At step 64, the word and phrase analyzer 28 reads the modified text data from the second text memory 26 and performs a morpheme analysis thereon according to the analysis rule in the word and phrase analysis dictionary 30.

At step 66, the word and phrase table processor 32 extracts temporal words from the modified text data which have been subjected to the morpheme analysis.

At step 68, the word and phrase table processor 32 prepares the word and phrase table 34A based on the temporal words in the pre-modification text data and also prepares the word and phrase table 34B based on the temporal words in the modified text data.

Returning to FIG. 2, at step 54, the location of correction detector 36 detects any temporal word which is out of the permissible interval of use based on the word and phrase table prepared at step 52. At step 56, the location of correction alerting unit 40 alerts a user to the occurrence of a temporal word which is out of the permissible interval of use, as detected at step 54, by displaying it.

Figure 4:
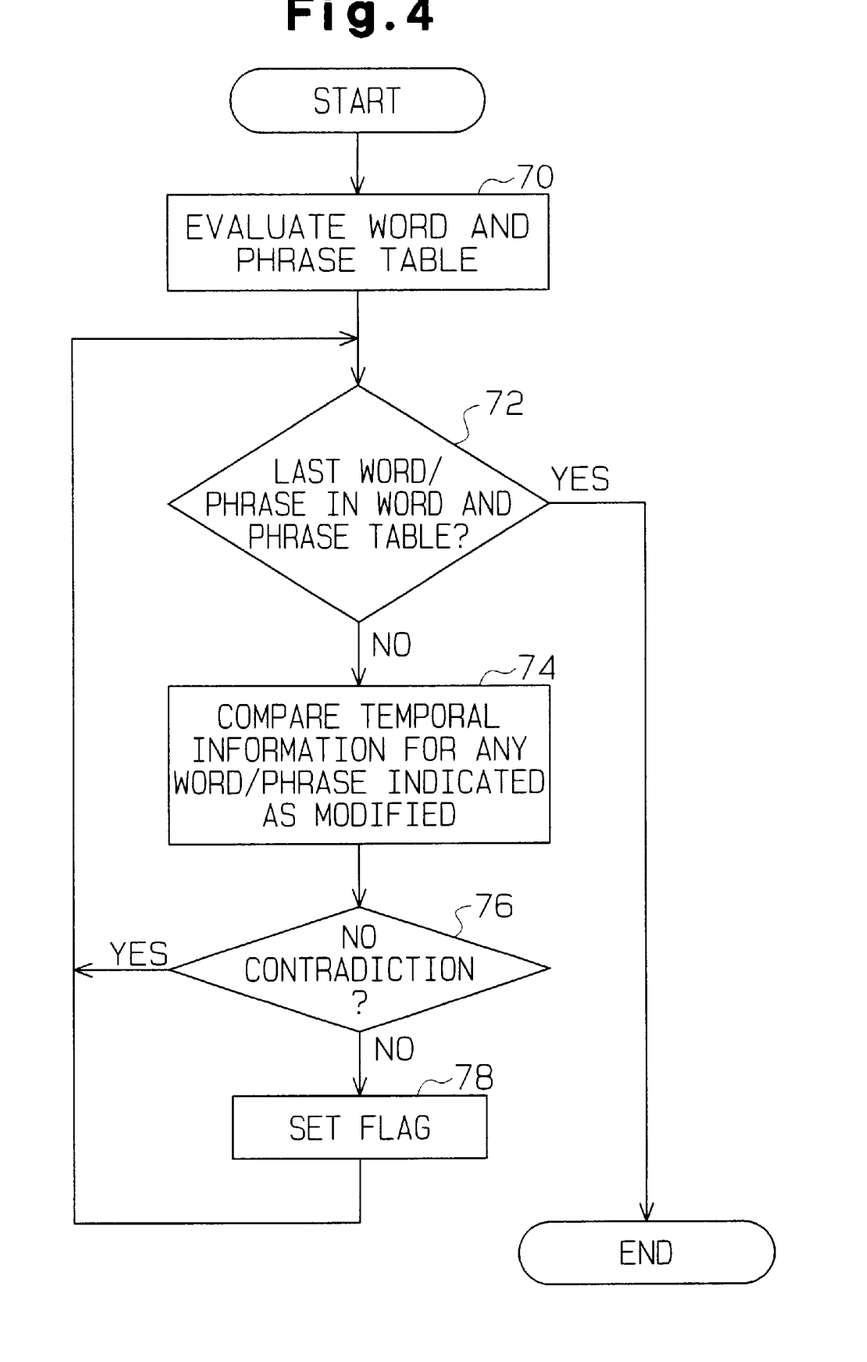
FIG. 4 is a flow chart of a subroutine which prepares a table and detects omissions of correction.

FIG. 4 shows the detail of the preparation of the word and phrase table which takes place at step 52 and the detection of a temporal word which is out of the permissible interval of use.

Initially, at step 70, the location of correction detector 36 compares each temporal word in the pre-modification word and phrase table 34A against each temporal word in the modified word and phrase table 34B to evaluate if any one of the corresponding temporal words is modified, and incorporates a result of such evaluation into the modified word and phrase table 34B.

At step 72, the location of correction detector 36 determines whether or not a comparison has been completed for the last temporal word in the modified word or phrase table 34B. If not, the operation proceeds to step 74. If yes, the evaluation is completed.

At step 74, the location of correction detector 36 compares the evaluation metrics of the temporal word in the modified word and phrase table 34B which is indicated as modified against the evaluation metrics of each temporal word.

At step 76, the location of correction detector 36 determines whether or not the evaluation metrics of the modified word or phrase contradicts the evaluation metrics of respective temporal words. If the presence of a contradiction is determined at step 76, the location of correction detector 36 turns ON the alert flag which is associated with the contradicting temporal word at step 78, and then returns to step 72. When no contradiction is found at step 76, the operation also returns to step 72. The location of correction detector 36 repeats the processing loop including steps 74, 76 and 78 until the processing of the last temporal word in the modified word and phrase table 34B is completed.

A specific alerting operation concerning a temporal word during editing a document will be described with reference to FIGS. 5 to 8. The text data of the document 80 shown in FIG. 7 is stored in the first text memory 24. The document 80 includes character strings corresponding to temporal phrases "Oct. 6, 1996" and "in the season of red leaves" and the temporal word "yesterday". The operator generates the document 82 shown in FIG. 8 by using the keyboard 18 or the mouse 20 or any other input device to modify the document 80. In the document 82, only the temporal phrase "Oct. 6, 1996" is modified to "Apr. 6, 1997".

The text data of the document 80 is subject to the morpheme analysis by the word and phrase analyzer 28. The temporal phrases "Oct. 6, 1996" and "in the season of red leaves" and the temporal word "yesterday" are extracted by the word and phrase table processor 32 to prepare the word and phrase table 34A shown in FIG. 5. The updated text data in the document 82 is subjected to the morpheme analysis by the word and phrase analyzer 28. The temporal phrases "Apr. 6, 1997", and "in the season of red leaves" and the temporal word "yesterday" are extracted by the word and phrase table processor 32 to prepare the word and phrase table 34B shown in FIG. 6.

On the basis of temporal information included in the temporal information dictionary 38, start data and end data "96. 10. 06" are established as evaluation metrics for the temporal phrase "Oct. 6, 1996" in the word and phrase table 34A. Similarly, start data "* *. 10. 01" and end data "* *. 10. 31" are established as evaluation metrics for the temporal phrase "in the season of red leaves". No evaluation metrics are established for "yesterday". In the word and phrase table 34B, start data and end data "97. 04.06" is established as evaluation metrics for the temporal phrase "Apr. 6, 1997". Start data ". 10. 01" and end data ". 10. 31", are established as evaluation metrics for the temporal phrase "in the season of red leaves". No evaluation metric is established for "yesterday".

A comparison is made between each temporal word before the modification and each corresponding temporal word after the modification, and YES or NO is established in the column of modification for each temporal word in the word and the phrase table 34B. Specifically, YES is established in the modification column for the temporal phrase "Apr. 6, 1997" while NO is established in the modification column for the temporal phrase "in the season of red leaves" and temporal word "yesterday" in the word and phrase table 34B.

Using the evaluation metrics for the temporal phrase "Apr. 6, 1997", which is indicated as modified, the evaluation metrics for the temporal phrases "Apr. 6, 1997" and "in the season of red leaves" and temporal word "yesterday" in the word and phrase table 34B are evaluated. Since the evaluation metric for the temporal phrase "Apr. 6, 1997" does not contradict the evaluation metrics for the temporal phrase "Apr. 6, 1997" which is indicated as modified, no alert flag is activated for the temporal phrase "Apr. 6, 1997". The evaluation metrics "97.04.06" for the temporal phrase "Apr. 6, 1997" is not included between the start data and the end data which define the evaluation metrics for the temporal phrase "in the season of red leaves", and thus is determined as contradicting, and accordingly, an alert flag is turned ON for the temporal phrase "in the season of red leaves". The evaluation metrics "97. 04. 06", for the temporal phrase "Apr. 6, 1997", contradicts the evaluation metrics for the temporal word "yesterday", and accordingly, an alert flag is turned ON for the temporal word "yesterday".

The temporal phrase "in the season of red leaves" and temporal word "yesterday" for which the alert flag is turned ON are preferably emphatically displayed on the screen of the display unit 42 by the location of correction alerting unit 40. In FIG. 8, the emphasis display is indicated by the double underlines. In this manner, an operators attention is directed to an omission or a mistake of correction in order to avoid such an omission or a mistake of correction to a temporal word used in the document. In the present embodiment, the emphasis display can be performed by properly identifying the temporal word which is not corrected on the basis of the predetermined permissible interval of use.

Figure 9:
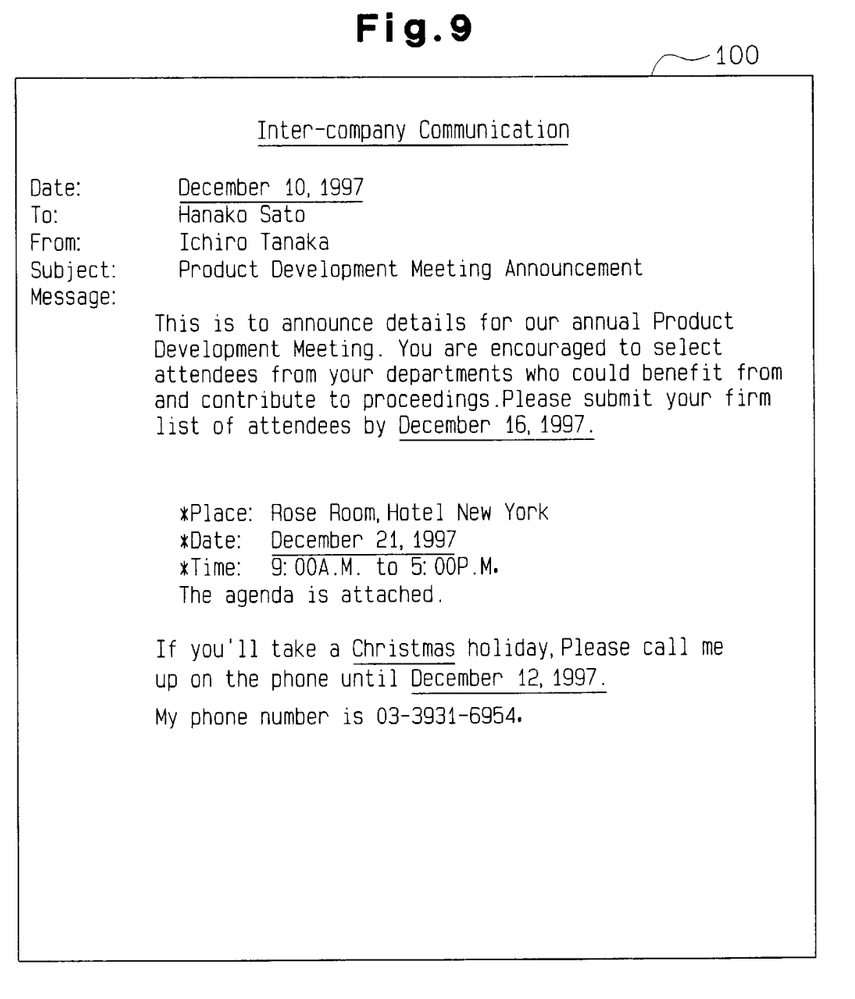
FIG. 9 depicts another text before modification as displayed on the display screen.
Figure 10:
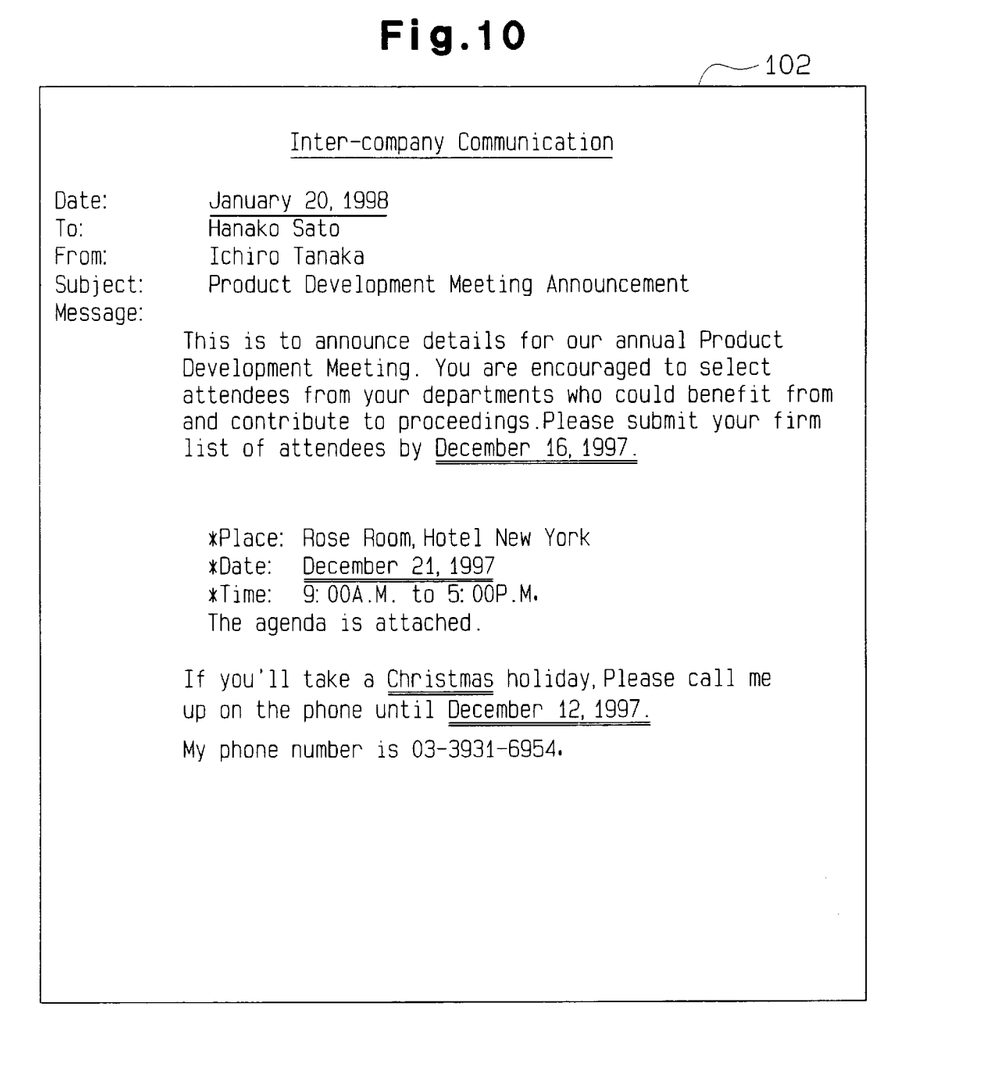
FIG. 10 depicts of FIG. 9 after modification as it is displayed on the display screen.
Figure 11:
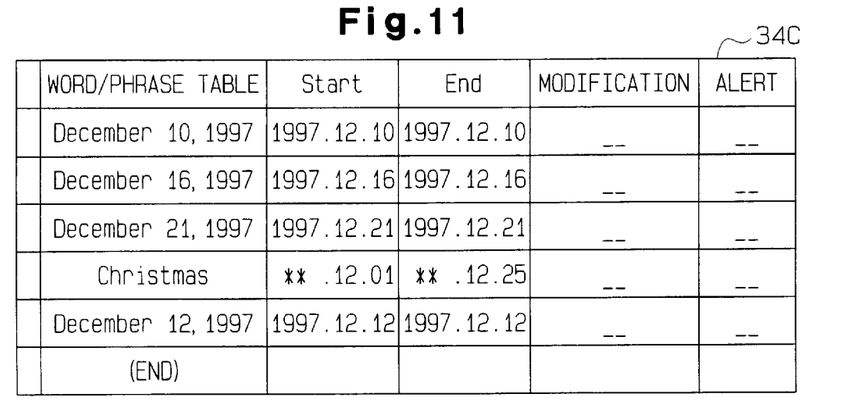
FIG. 11 is a word and phrase table for the text data of FIG. 9.
Figure 12:
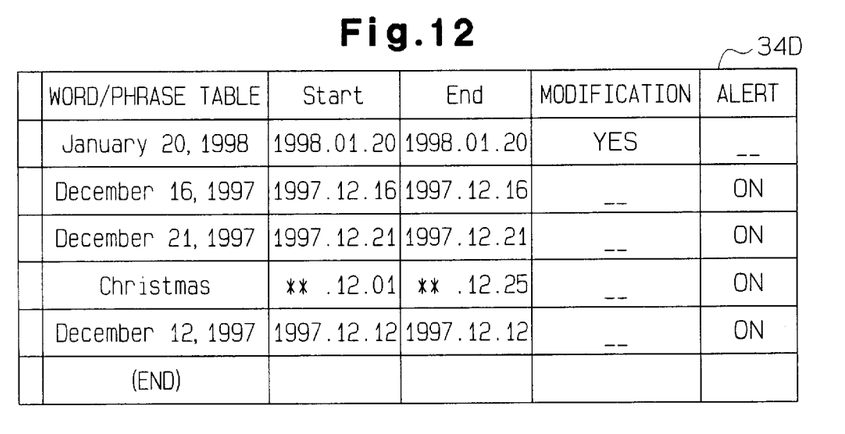
FIG. 12 is a word and phrase table for the text data of FIG. 10.

The present invention is equally applicable to a document 100 as shown in FIG. 9. FIG. 9 shows a pre-correction document 100, and FIG. 10 shows a document 102 in which the temporal phrase "Dec. 10, 1997" appearing in the document 100 of FIG. 9 has been changed to "Jan. 20, 1998". Based on this correction, the CPU 12 emphatically displays other temporal phrases or word "Dec. 16, 1997", "Dec. 21, 1997", "Christmas" and "Dec. 12, 1997" appearing in the document 102 on the screen of the display unit 42 (the emphasis display is indicated in FIG. 10 in double underlines). In this manner, the CPU 12 specifies a temporal word or phrase to be corrected, by using the word and phrase tables 34C and 34D shown in FIGS. 11 and 12, respectively.

Figure 13:
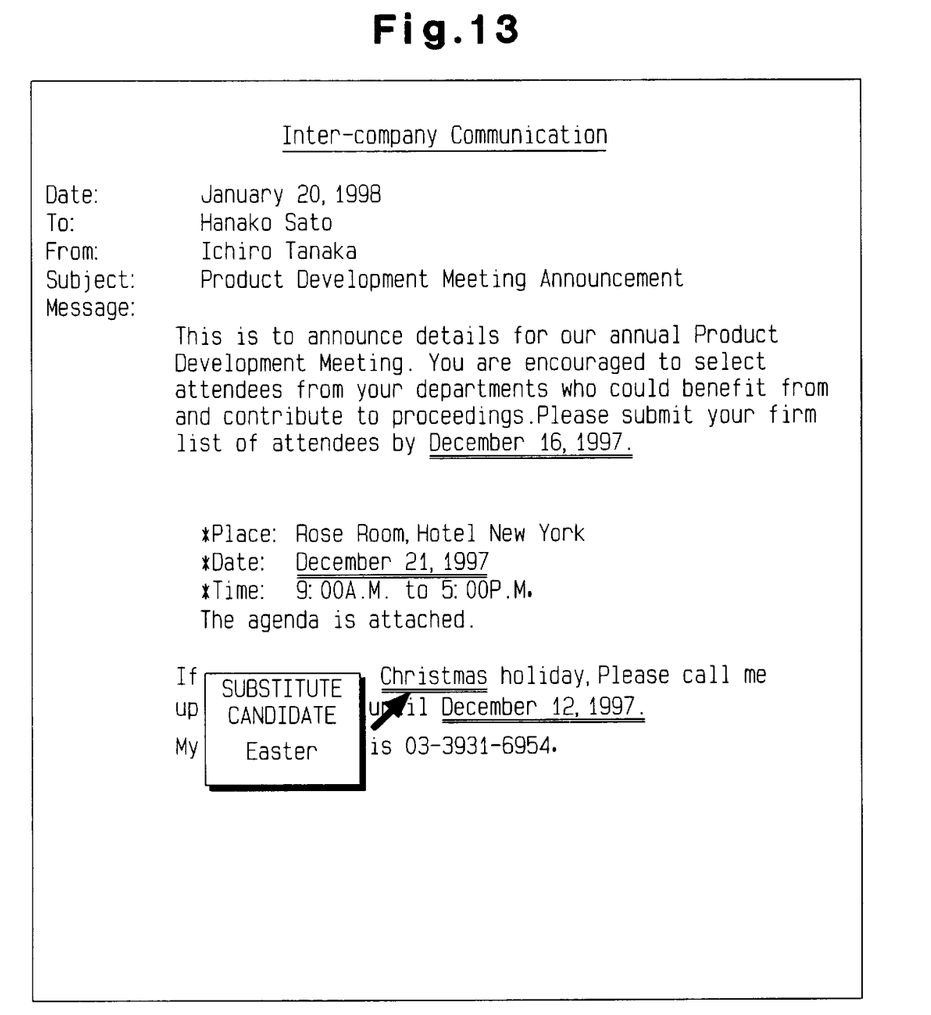
FIG. 13 depicts a displayed document containing a substitute candidate for a temporal word was not corrected.

In addition, the document processing apparatus 10 of the present invention may display one or more alternative or substitute candidates for the temporal word subjected to emphasis display (for example, a substitute candidate for "Christmas" is "Easter"), as illustrated in FIG. 13. When the operator judges that one of the substitute candidates is proper, the mouse 20 or predetermined key stroke or command may be used to select the desired substitute candidate. In response to the substitute operation by the operator, the CPU 12 substitutes the temporal word or phrase. Of course, the operator can also supply a different substitute word or phrase.

Figure 14:
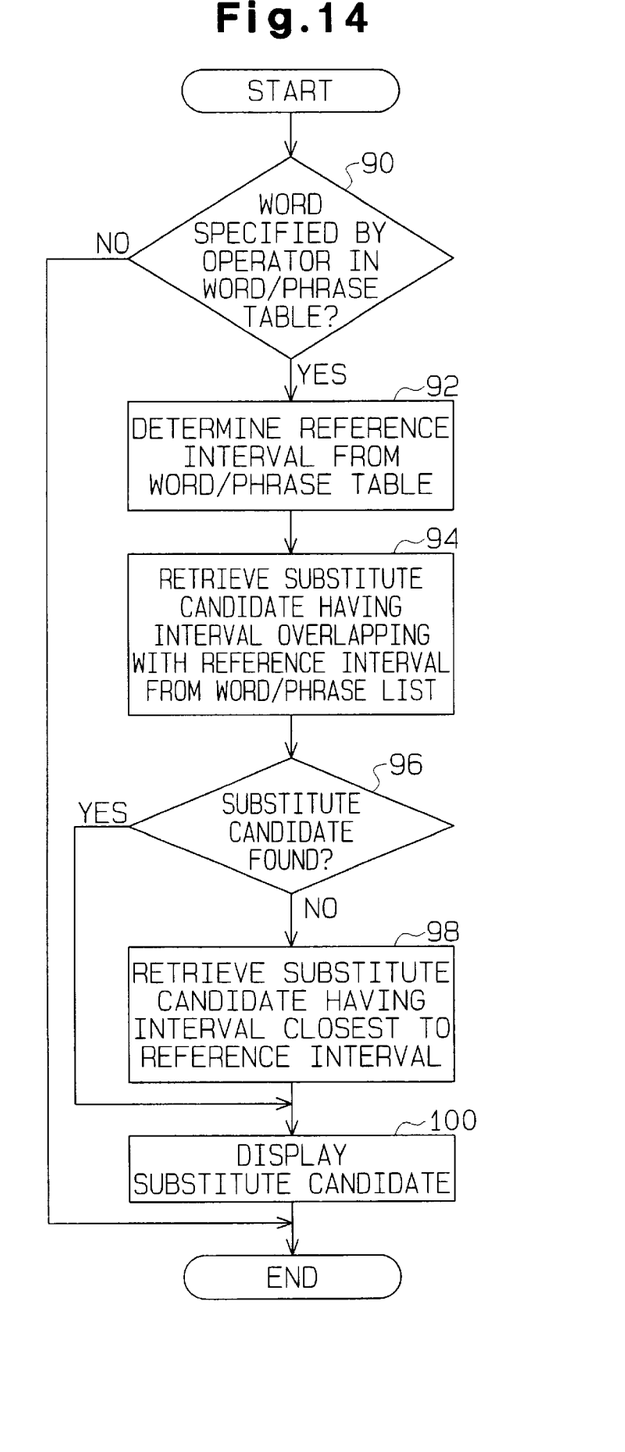
FIG. 14 is a flow chart of a subroutine used to display the substitute candidate for the temporal word of FIG. 13.

FIG. 14 is a flow chart of the display operation for a substitute candidate for a temporal word. At step 90, when the operator moves the cursor to a word (which may be "Christmas", for example) for which the display of a substitute candidate is desired by operating the keyboard 18, the CPU 12 refers to the word and phrase table 34D and retrieves a temporal word which matches the temporal word located at the cursor position. If such a temporal word exists, at step 92, the CPU 12 refers to the word and phrase table 34D to retrieve a reference period (which may be "1998. 01. 20-1998.01.20", for example) for the substitute candidate.

Figure 15:
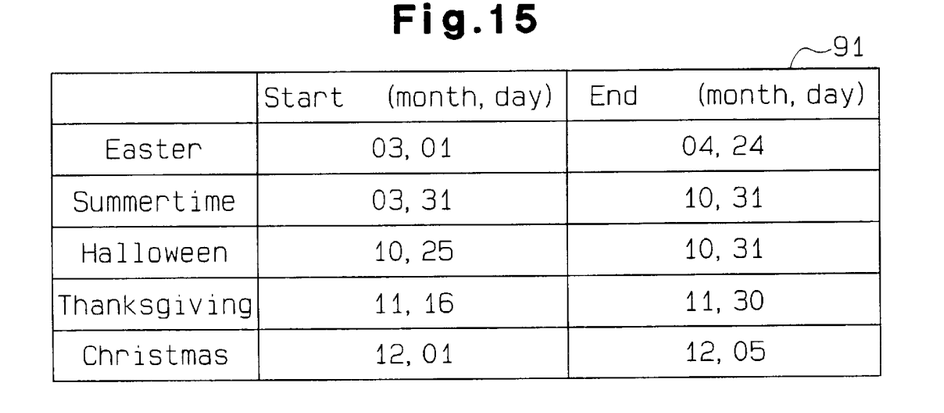
FIG. 15 shows a list of substitute candidate words and phrases.

The CPU 12 then refers to a word and phrase list 91 in order to retrieve a substitute candidate having an interval which overlaps the reference period. When the substitute candidate is found to exist, the substitute candidate is displayed on the display unit 42 at step 100. If no substitute candidate exists, a substitute candidate is retrieved at step 98 which has an interval closest to the reference period. In this instance, a substitute candidate "Easter" having an interval "03.01-04.24" is selected. Subsequently, the substitute candidate "Easter" is displayed on the display unit 42 as shown in FIG. 13.

It should be apparent to those skilled in the art that the present invention may be embodied in many other specific forms without departing from the spirit or scope of the invention. Therefore, the present examples and embodiments are considered as illustrative and not restrictive and the invention is not to be limited to the details given herein, but may be modified within the scope and equivalence of the appended claims.

What is claimed is:

1. A document processing apparatus for editing document data, comprising:
   an input unit for receiving first document data and second document data, the second document data being a revised version of the first document data, the first and the second document data including first and second word data related to time, respectively;
   a processing unit connected to the input unit, receiving the first and the second document data from the input unit and determining whether the second time-related word data is properly updated using the first and the second time-related word data; and
   an output unit for outputting the determination result to inform an operator that the second time-related word data has been properly updated.

2. The document processing apparatus of claim 1, wherein the output unit provides the determination result to a display unit so that a display of the second time-related word data which is not properly updated is emphasized.

3. The document processing apparatus of claim 1, wherein the emphasis includes a high luminance display.

4. The document processing apparatus of claim 1, wherein the emphasis includes a flashing display of the improperly updated second time-related word data.

5. The document processing apparatus of claim 1, wherein the processing unit provides a substitute word for the improperly updated second time-related word data.

6. A document processing apparatus for editing document data, comprising:

an input unit used by an operator to prepare first document data and which permits second document data to be prepared by updating the first document data, the first and the second document data including first and second time-related word data, respectively;

a first storage unit for storing the first document data;

a second storage unit for storing the second document data;

a display unit for displaying the first and second document data;

a control unit for causing the first document data stored in the first storage unit to be displayed on the display unit before editing the first document data takes place and for causing the second document data stored in the second storage unit to be displayed on the display unit after editing the first document data; and a processing unit for reading the first and the second document data from the first and the second storage unit, respectively and for determining if the second time-related word data has not been properly updated using the first and the second time-related word data, wherein the control unit controls the display unit so that the improperly updated second time-related word data is displayed on the display unit in a manner identifiable by the operator.

7. The document processing apparatus of claim 6, wherein the display in a manner identifiable by the operator includes an emphasis display of the second time-related word data detected which is not properly updated.

8. The document processing apparatus of claim 7, wherein the emphasis display includes a high luminance display of the improperly updated second time-related word data.

9. The document processing apparatus of claim 7, wherein the emphasis display includes a flashing display of the improperly updated second time-related word data detected.

10. The document processing apparatus of claim 6, wherein the processing unit analyzes the first and the second document data according to a predetermined analysis rule.

11. The document processing apparatus of claim 6, further comprising a temporal information dictionary storing predetermined temporal information which corresponds to the time-related word data, and wherein the processing unit searches temporal information of the first and the second time-related word data on the basis of the predetermined temporal information and detects the improperly updated second time-related word data on the basis of the searched temporal information.

12. The document processing apparatus of claim 11, wherein the predetermined temporal information includes information representing a permissible interval of use for the time-related word data.

13. The document processing apparatus of claim 6, wherein the control unit controls the display unit so that a substitute candidate for the improperly updated second time-related word data is displayed on the display unit.

14. A document processing method for editing document data, comprising the steps of:

inputting first document data and second document data, the second document data being an updated version of the first document data, the first and the second document data including first and second time-related word data, respectively, determining whether the second time-related word data is properly updated using the first and the second time-related word data; and outputting a result of determination such that the improperly updated second time-related word data is recognized by an operator.

15. The document processing method of claim 14, wherein the outputting step includes a step of providing an emphasis display of the improperly updated second time-related word data on the basis of the result of determination.

16. The document processing method of claim 14, further comprising the step of outputting time-related word data which is a substitute candidate for the improperly updated second time-related word data.

17. A document processing method for editing document data, comprising the steps of:

inputting first document data and second document data, the second document data being an updated version of the first document data, the first and the second document data including first and second time-related word data, respectively;

storing the first document data in a first storage unit;

storing the second document data in a second storage unit;

displaying the first document data stored in the first storage unit on a display unit before editing the first document data and displaying the second document data stored in the second storage unit on the display unit after editing the first document data;

reading the first and the second document data from the first and the second storage units, respectively;

detecting second time-related word data which has not been properly updated using the first and the second time-related word data; and displaying the detected improperly updated second time-related word data on the display unit in a manner identifiable by an operator.

18. The document processing method of claim 17, wherein the step of displaying the second time-related word data in a manner identifiable by an operator includes the step of providing an emphasis display of the improperly updated second time-related word data.

19. The word processing method of claim 17, further comprising the step of displaying time-related word data which is a substitute candidate for the improperly updated second time-related word data on the display unit.

20. A recording medium having stored therein a computer readable program for editing document data, the program executing a method comprising the steps of:

receiving first document data and second document data, the second document data being a revised version of the first document data, the first and the second document data including first and second time-related word data, respectively;

determining whether the second time-related word data has been properly updated using the first and the second time-related word data; and outputting a determination result such that the improperly updated second time-related word data is recognized by an operator.

21. The recording medium of claim 20, wherein the step of outputting includes the step of providing an emphasis display of the improperly updated second time-related word data.

22. The recording medium of claim 20, the method further comprising the step of outputting time-related word data which is a substitute candidate for the improperly updated second time-related word data.

23. A recording medium having stored therein a computer readable program for editing a document, the program executing a method comprising the steps of:

receiving first document data and second document data, the second document data being a revised version of the first document data, the first and the second document data including first and second time-related word data, respectively;

storing the first document data in a first storage unit;

storing the second document data in a second storage unit;

displaying the first document data stored in the first storage unit on a display unit before editing the first document data and displaying the second document data stored in the second storage unit on the display unit after editing the first document data;

reading the first and the second document data from the first and the second storage units, respectively;

detecting the second time-related word data which has not been properly updated using the first and the second time-related word data; and displaying the improperly updated second time-related word data on the display unit in a manner identifiable by an operator.

24. The recording medium of claim 23, wherein the step of displaying the second time-related word data in a manner identifiable by an operator includes the step of providing an emphasis display of the improperly updated second time-related word data.

25. The recording medium of claim 23, the method further comprising the step of displaying time-related word data which is a substitute candidate for the improperly updated second time-related word data.

* * * * *